(12) United States Patent
Kona et al.

(10) Patent No.: US 11,194,693 B2
(45) Date of Patent: Dec. 7, 2021

(54) TRACE DATA

(71) Applicant: ARM LIMITED, Cambridge (GB)

(72) Inventors: Anitha Kona, Austin, TX (US); Michael John Williams, Cambridge (GB); John Michael Horley, Cambridge (GB); Alasdair Grant, Cambridge (GB)

(73) Assignee: ARM LIMITED, Cambridge (GB)

( * ) Notice: Subject to any disclaimer, the term of this patent is extended or adjusted under 35 U.S.C. 154(b) by 734 days.

(21) Appl. No.: 15/711,028

(22) Filed: Sep. 21, 2017

(65) Prior Publication Data
US 2019/0087298 A1 Mar. 21, 2019

(51) Int. Cl.
*G06F 11/34* (2006.01)
(52) U.S. Cl.
CPC ........ *G06F 11/348* (2013.01); *G06F 11/3461* (2013.01); *G06F 11/3466* (2013.01)
(58) Field of Classification Search
CPC . G06F 11/348; G06F 11/3461; G06F 11/3466
USPC ...................................................... 702/186
See application file for complete search history.

(56) References Cited

U.S. PATENT DOCUMENTS

| | | | | |
|---|---|---|---|---|
| 2002/0120815 A1* | 8/2002 | Zahavi | ............... | G06F 11/3034 711/118 |
| 2006/0259823 A1* | 11/2006 | Sohm | ................. | G06F 11/3636 714/38.13 |
| 2006/0259833 A1* | 11/2006 | Swoboda | ........... | G06F 11/3466 714/47.1 |
| 2008/0155348 A1* | 6/2008 | Ivanov | ............... | G06F 11/3466 714/45 |
| 2008/0162900 A1* | 7/2008 | Rolfsmeier | ......... | G06F 11/3636 712/227 |
| 2012/0079324 A1* | 3/2012 | Aphale | .............. | G06F 11/3636 714/26 |
| 2012/0272011 A1* | 10/2012 | Carrie | ................ | G06F 11/3466 711/146 |
| 2018/0032117 A1* | 2/2018 | Leigh | ..................... | G06F 1/266 |

* cited by examiner

*Primary Examiner* — Michael P Nghiem
(74) *Attorney, Agent, or Firm* — Nixon & Vanderhye P.C.

(57) ABSTRACT

A data processing apparatus is provided that includes monitor circuitry to produce local trace data indicating behaviour of the data processing apparatus. Interface circuitry communicates with a second data processing apparatus and encoding circuitry produces an encoded instruction to cause the local trace data to be stored in storage circuitry of the second data processing apparatus or to be output at output circuitry of the second data processing apparatus. The interface circuitry transmits the encoded instruction to the second data processing apparatus.

5 Claims, 4 Drawing Sheets

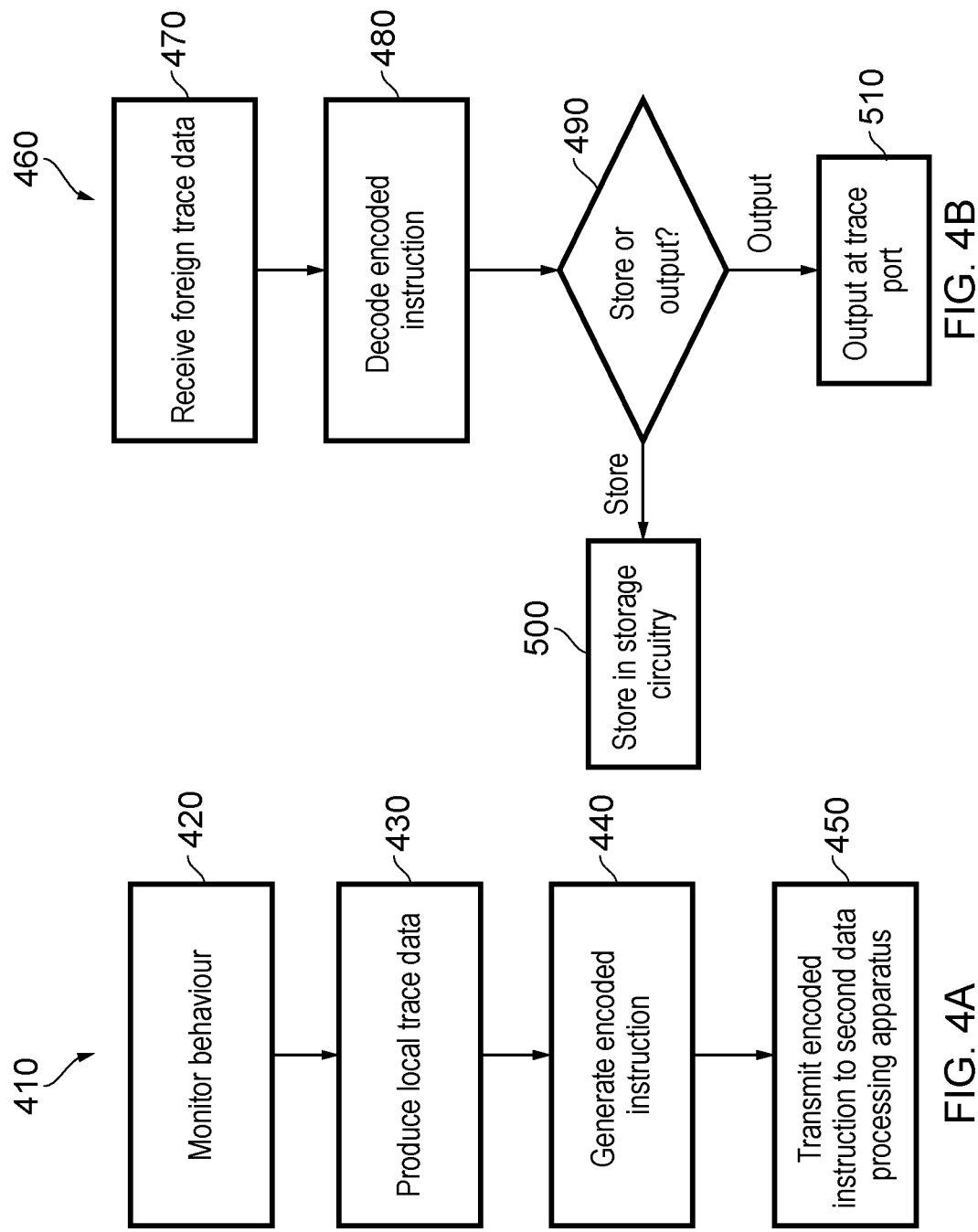

TRACE DATA

TECHNICAL FIELD

The present disclosure relates to data processing. More particularly, it relates to trace data.

DESCRIPTION

Trace can be used to examine the behaviour of a data processing apparatus, including processing circuitry within the data processing apparatus. As the processing circuitry operates, a number of data trace packets are generated and output via a trace output port. These can be collected by a connected processing device such as a conventional PC. Each packet represents a change in the state of the processing circuitry or a part thereof. In this way, by obtaining the trace data packets from the trace output port and examining them, it is possible to determine the changes that have gone on in, for example, the processing circuitry. Using this information it is possible to determine the sequence of actions that cause particular behaviour to occur. Some systems include many such data processing apparatuses and it might be desirable to trace the behaviour of all such devices. However, if each data processing apparatus outputs trace data by its trace output port, then this would require a large number of connections to be made to (e.g. the PC) in order to collect all the trace data. Owing to the number and size of trace data packets that can be generated in order to thoroughly analyse the behaviour of a data processing apparatus, such links would have to be capable of supporting a high bandwidth. This is especially true if trace must take place for an extended period of time to find the ultimate cause of particular behaviour of the data processing apparatus. Such a system is therefore expensive to produce and would as a result of these connections, occupies a larger circuit area and consumes more power than systems where trace is not provided for every data processing apparatus.

SUMMARY

Viewed from a first example configuration there is provided a data processing apparatus comprising: monitor circuitry to produce local trace data indicating a behaviour of said data processing apparatus; interface circuitry to communicate with a second data processing apparatus; and encoding circuitry to produce an encoded instruction to cause said local trace data to be stored in storage circuitry of said second data processing apparatus or to be output at output circuitry of said second data processing apparatus, wherein said interface circuitry transmits said encoded instruction to said second data processing apparatus.

Viewed from a second example configuration, there is provided a data processing apparatus comprising: interface circuitry to communicate with a second data processing apparatus to receive foreign trace data indicating a behaviour of said second data processing apparatus; output circuitry to output trace data; and decoding circuitry to decode an encoded instruction comprising said foreign trace data from said second data processing apparatus, wherein in response to said encoded instruction, said data processing apparatus stores said foreign trace data in storage circuitry or outputs said foreign trace data at said output circuitry.

Viewed from a third example configuration, there is provided a method comprising: producing local trace data indicating a behaviour of a data processing apparatus; communicating with a second data processing apparatus; and producing an encoded instruction to cause said local trace data to be stored in storage circuitry of said second data processing apparatus or to be output at output circuitry of said second data processing apparatus, wherein said encoded instruction is transmitted to said second data processing apparatus.

Viewed from a fourth example configuration, there is provided a method comprising: communicating with a second data processing apparatus to receive foreign trace data indicating a behaviour of said second data processing apparatus; decoding an encoded instruction comprising said foreign trace data from said second data processing apparatus; and in response to an encoded instruction, storing said foreign trace data in storage circuitry or outputting said foreign trace data at output circuitry.

BRIEF DESCRIPTION OF THE DRAWINGS

The present invention will be described further, by way of example only, with reference to embodiments thereof as illustrated in the accompanying drawings, in which:

FIG. 4A illustrates a flow chart that illustrates a method according to some embodiments; and FIG. 4B illustrates a flow chart that describes a method according to some embodiments.

DESCRIPTION OF EXAMPLE EMBODIMENTS

Figure 1:
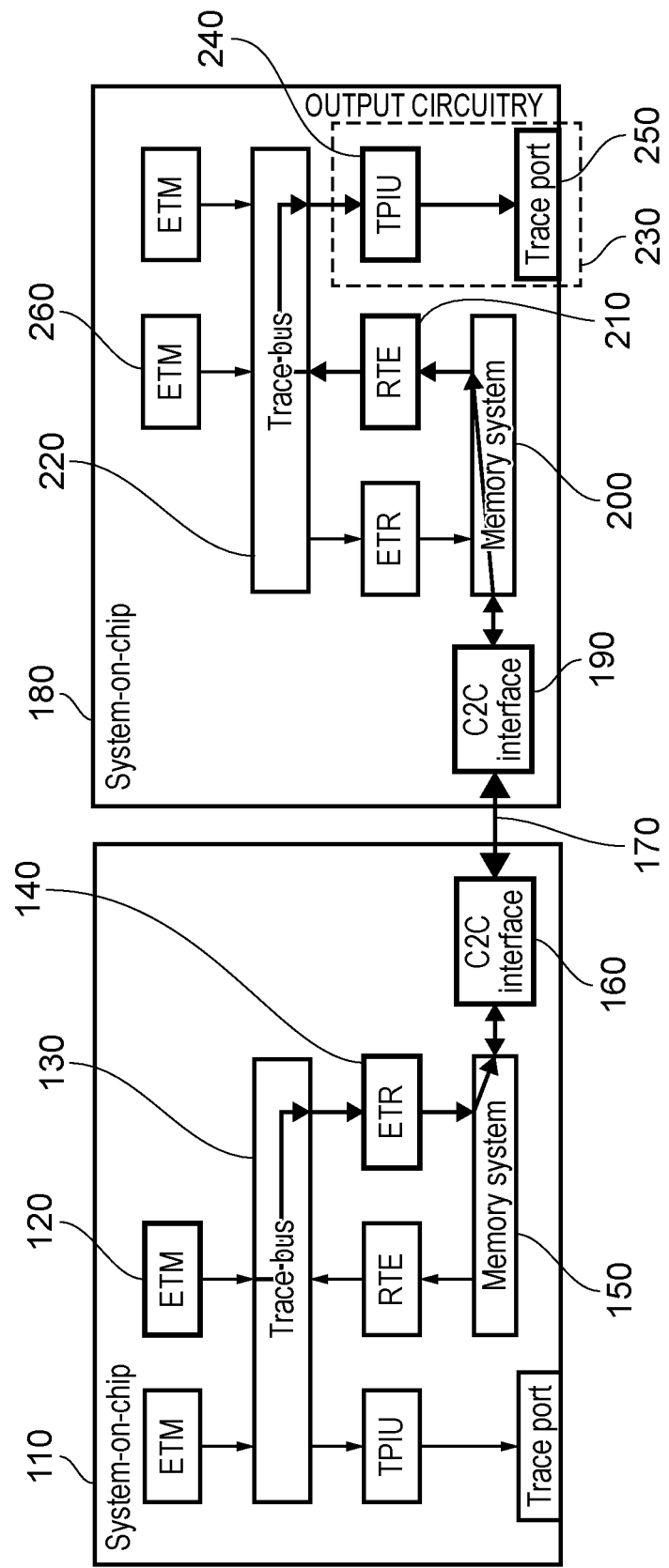
FIG. 1 illustrates a system-on-chip in accordance with some embodiments.

Before discussing the embodiments with reference to the accompanying figures, the following description of embodiments is provided.

In accordance with one example configuration there is provided a data processing apparatus comprising: monitor circuitry to produce local trace data indicating a behaviour of said data processing apparatus; interface circuitry to communicate with a second data processing apparatus; and encoding circuitry to produce an encoded instruction to cause said local trace data to be stored in storage circuitry of said second data processing apparatus or to be output at output circuitry of said second data processing apparatus, wherein said interface circuitry transmits said encoded instruction to said second data processing apparatus.

In accordance with the above, the monitoring circuitry generates local trace data that indicates or reflects the behaviour of the data processing apparatus. The behaviour in question could relate to the data processing as a whole, or part of that data processing apparatus such as processing circuitry. The data processing apparatus could also be distributed in that the monitor circuitry could be a separate physical device. The trace data is referred to as local so that it is distinguished from trace data relating to a different data processing apparatus. Having generated the local trace data, the encoding circuitry produces an encoded instruction comprising the local trace data. The encoded instruction causes the local trace data to be stored in storage circuitry belonging to a second data processing apparatus or to be output at output circuitry of that second data processing apparatus. Note that there is no requirement that the data processing apparatus and the second data processing apparatus are the same, or that the second data processing apparatus has any components in common with the data processing apparatus, although in some embodiments this is so. The encoded instruction, having been generated, is transmitted to the second data processing apparatus. Accordingly, the data processing apparatus uses interface circuitry to communicate with the second data processing apparatus, to output or store the local trace data. In some embodiments, the encoded instruction itself dictates whether the second data processing apparatus should store or output the local trace data. In other embodiments, the encoded instruction makes a request, but the second data processing apparatus itself determines what happens to the local trace data. In yet other embodiments, the encoded instruction does not provide any indicate as to what should happen to the local trace data and this is instead determined by the second data processing apparatus. As a consequence of the above arrangement, the need for the data processing apparatus to have dedicated circuitry for outputting the local trace data, such as a trace output port, can be reduced or eliminated. Instead, the data processing apparatus is able to make use of "existing" circuitry, which is otherwise used to communicate with other devices, in order to output the local trace data. This can therefore reduce the circuit space and power consumption as compared to a system where dedicated trace outputs are provided on each data processing apparatus.

In some embodiments said interface circuitry is an interface from the list comprising: PCIe, CCIX, and Gen-Z. This list of interfaces is a list of previously proposed high bandwidth interfaces that can be used for communication between data processing apparatuses. Other compatible interfaces will be known to the skilled person.

In some embodiments said interface circuitry is used for communication of data other than said local trace data and said encoded instruction. In such embodiments, the interface circuitry is not dedicated to the transmission and receiving of trace data or the encoded instruction. Instead, the interface can be used in order to transmit instructions other than in said in encoded instruction. Such other instructions may be used in order to store data in storage circuitry of another second data processing apparatus. Other instructions may also request data from said second data processing apparatus. Similarly, the interface circuitry may be used in order to communicate with devices other than said second data processing apparatus.

In some embodiments, said interface circuitry is used for communication of data other than trace data. Accordingly, the interface circuitry may be shared for other types of communication sent by the data processing apparatus. Rather than provide dedicated communication links specifically for the communication of the trace data, the trace data can be communicated by use of existing interface circuitry.

In some embodiments, said data processing apparatus comprises further interface circuitry to communicate with a third data processing apparatus to receive foreign trace data indicating a behaviour of said third data processing apparatus, wherein said encoding circuitry is adapted to produce a second encoded instruction to cause said foreign trace data to be stored in storage circuitry of said second data processing apparatus or to be output at output circuitry of said second data processing apparatus. Consequently, such data processing apparatuses not only generate local trace data, but also receive foreign trace data indicating the behaviour of another (third data processing apparatus). The foreign trace data and the local trace data are forwarded to yet another (second data processing apparatus). This enables both the data processing apparatus and the third data processing apparatus to forgo the use of trace output ports, and instead rely on "existing" communication interfaces between data processing apparatuses.

In some embodiments, said data processing apparatus comprises: amalgamation circuitry to amalgamate said foreign trace data with said local trace data to produce amalgamated trace data, wherein said encoding circuitry has a separated mode of operation where said encoded instruction and said second encoded instruction are transmitted at said output circuitry separately; and said encoding circuitry has an amalgamated mode of operation where said encoded instruction and said second encoded instruction are the same and said encoded instruction is adapted to cause said amalgamated trace data to be stored in storage circuitry of said second data processing apparatus or to be output at output circuitry of said second data processing apparatus. By amalgamating the local trace data and the foreign trace data, it may be possible to improve the extent to which compression is available when transmitting the data—especially if the local trace data and the foreign trace data have common data blocks.

In some embodiments, said interface circuitry is said further interface circuitry. Accordingly, the interface circuitry may be the same as the further interface circuitry.

In some embodiments, said data processing apparatus is a System-on-Chip. A System-on-Chip (SoC) is a chip or circuit comprising a number of components necessary for computation. In particular, this typically includes a processor and a memory. Such devices may be used in order to provide processing capabilities on a small scale and typically they have a low power consumption requirement. In other embodiments, said data processing apparatus is an accelerator such as an external GPU added through a PCIe, CCIX, or Gen-Z interface.

In accordance with one example configuration there is provided a data processing apparatus comprising: interface circuitry to communicate with a second data processing apparatus to receive foreign trace data indicating a behaviour of said second data processing apparatus; output circuitry to output trace data; and decoding circuitry to decode an encoded instruction comprising said foreign trace data from said second data processing apparatus, wherein in response to said encoded instruction, said data processing apparatus stores said foreign trace data in storage circuitry or outputs said foreign trace data at said output circuitry.

Such a data processing apparatus uses interface circuitry to communicate with a second data processing apparatus in order to receive foreign trace data that is indicative of the behaviour of the second data processing apparatus. Note that as above, there is no requirement that the data processing apparatus and the second data processing apparatus are identical. In this case, the data processing apparatus includes output circuitry that outputs trace data. Furthermore, the data processing apparatus includes decoding circuitry that is able to decode an encoded instruction that is received from the second data processing apparatus and comprises the foreign trace data that indicates the behaviour of the second data processing apparatus. When the encoded instruction has been received and decoded by the decoding circuitry, the foreign trace data could be stored in the storage circuitry or could be output by the output circuitry. In some embodiments, the action to be taken is indicated by the encoded instruction itself. In other embodiments, the action to be taken is determined by the data processing apparatus.

In some embodiments, said data processing apparatus comprises: monitor circuitry to produce local trace data indicating a behaviour of said data processing apparatus, wherein in response to said local trace data being produced, said local trace data is either output at said output circuitry or stored in said storage circuitry. As well as being able to receive an encoded instruction that causes foreign trace data indicating the behaviour of the second data processing apparatus to be either stored or output, the data processing apparatus includes monitor circuitry that produces local trace data indicating the behaviour of the data processing apparatus itself. In these embodiments, once this data has been produced, it can either be output at the output circuitry or stored in the storage circuitry in a similar manner of the foreign trace data that is received as part of the encoded instruction.

In some embodiments, said data processing apparatus comprises: amalgamation circuitry to amalgamate said local trace data with said foreign trace data to produce amalgamated data, wherein said local trace data is output at said output circuitry by outputting said amalgamated data at said output circuitry; and said local trace data is stored in said storage circuitry by storing said amalgamated data in said storage circuitry. The amalgamation circuitry may be used in order to amalgamate the local trace data with the foreign trace data there by producing amalgamated data. This amalgamated data could be the data that is either output by the output circuitry or stored in the storage circuitry. By amalgamating the local trace data and the foreign trace data it may be possible to take advantage of particular compression schemes due to, for example, the use of repetition within the amalgamated trace data. Accordingly, this can reduce the bandwidth used when outputting trace data associated with both a data processing apparatus and a second data processing apparatus.

In some embodiments, said output circuitry outputs said trace data by writing said trace data to DRAM. The DRAM may be shared by the data processing apparatus and other devices that are used in order to access the trace data in order to analyse that trace data.

In some embodiments, said output circuitry comprises a trace output port; and said output circuitry outputs said trace data by outputting said trace data on said trace output port. A trace output port provides a mechanism by which a further device can access the trace data. For example, by connecting to the data processing apparatus via the trace output port, the device can receive the trace data packets that are output by the data processing apparatus. Those packets can then be analysed by the further device in order to determine the underlying behaviour.

In some embodiments, said interface circuitry is adapted to communicate with a plurality of second data processing apparatuses; said decoding circuitry is adapted to decode an encoded instruction from any of said second data processing apparatuses. Consequently, the data processing apparatus can receive data from a number of other data processing apparatuses. This can obviate the need for any of the other data processing apparatuses to include dedicated circuitry for outputting the trace data produced at that data processing apparatus. As above, there is no requirement that a second data processing apparatus is identical to the data processing apparatus.

In some embodiments, said interface circuitry is an interface from the list comprising: PCIe, CCIX, and Gen-Z. It will be appreciated by the skilled person that PCIe, CCIX, and Gen-Z are examples of high bandwidth transmission protocols that can be used to enable communication between a data processing apparatus and another data processing apparatus. Other such interfaces will be known to the skilled person.

In some embodiments, said interface circuitry is used for communication of data other than said local trace data and said encoded instruction. Consequently, there is no requirement that the interface circuitry is used as a dedicated means of communication for the transmission of only trace data. Indeed, in such embodiments, the interface circuitry may be used for communicating other data or instructions. For example, such instructions may be a request for information from another device or the delivery of such information as requested by another device.

In some embodiments, said interface circuitry is used for communication of data other than trace data. Again, in such embodiments, the interface circuitry is not dedicated to the communication of trace data, but is instead is used for the transmission and receiving of other data.

In some embodiments, said data processing apparatus is a System-on-Chip. A System-on-Chip (SoC) is a device that contains components for performing computation, e.g. a processor and a memory. These components are provided on a single chip or as part of a single circuit. Accordingly, data processing capabilities can be provided in a small space and using a small amount of power. This also makes its possible for a large number of data processing devices to be stored on a single Printed Circuit Board (PCB). By using "existing" circuitry to gather the trace data across each data processing apparatus rather than providing dedicated circuitry for obtaining or sharing the trace data on each data processing apparatus, it is possible to obtain a reduction in the space required and therefore the power consumption of the overall system. In other embodiments, said data processing apparatus is an accelerator.

Particular embodiments will now be described with reference to the figures.

FIG. 1 illustrates a system 100 comprising a System-on-Chip (SoC) 110 (which is an example of a data processing apparatus). The SoC 110 comprises processing circuitry (not shown) that may perform a task such as executing a stream of instructions. An Embedded Trace Macrocell (ETM) 120, which is an example of the claimed monitor circuitry, generates trace data packets that indicate a behaviour of the SoC 110 during the execution of those instructions. Such trace packets may indicate changes in state of the SoC 110 or its processing circuitry during the execution of those instructions, or may indicate the result of micro-operations that go on in part of the SoC 110 such as the processing circuitry during the execution of the instructions. The trace data that is generated by the ETM 120 is passed through a trace bus 130 to an Embedded Trace Router 140 (ETR). The ETR is an example of the claimed encoding circuitry. The ETR 140 thereby generates an encoded instruction. The encoded instruction references the trace data packet that has been generated by the ETM 120. The encoded instruction causes a receiving data processing apparatus that receives and executes the encoded instruction to either store the local trace data in storage circuitry of that receiving data processing apparatus or to output that local trace data at output circuitry of that receiving data processing apparatus. The encoded instruction is then passed through a memory system 150 to a Chip-to-Chip (C2C) interface 160, which is an example of the claimed interface circuitry. The C2C interface enables the SoC 110 to communicate with a difference SoC 180 via a channel 170. Such a channel 170 could, for example, take the form of a bus. There are a number of such interface circuits available. For example, the C2C interface 160 may be implemented using PCIE, CCIX, or Gen-Z. Other interfaces will be known to the skilled person.

In this embodiment, the C2C interface 160 can be used for communication of data other than the local trace data generated by the ETM 120 and other than the encoded instruction generated by the ETR 140. Indeed, in this embodiment, the C2C interface 160 may be used for the communication of data other than trace data. For example, processing circuitry of the SoC 110 may generate a data request instruction that is passed to the C2C interface 160 in order to request specific data from a different SoC. Similarly, other instructions may be generated in order to return such requested data back to a SoC.

The encoded instruction is received by a C2C interface 190 of a different SoC 180. Here, the different SoC 180 is an example of the claimed second data processing apparatus while the C2C interface 190 of the SoC 180 is an example of interface circuitry of the second data processing apparatus. The received encoded instruction is passed from the C2C interface 190 through the memory system 200 to RTE unit 210. The RTE 210 performs the opposite operation to the ETR 140. In other words, rather than encoding local trace data into an encoded instruction, the RTE unit 210 decodes an encoded instruction in order to obtain what is now referred to as foreign trace data. The foreign trace data is foreign from the perspective of the SoC 180, since it has been generated by a different SoC 110. The foreign trace data is then passed from the RTE unit 210 through a trace bus 220 to output circuitry 230. The output circuitry 230 comprises a Trace Port Interface Unit (TPIU) 240, which receives the foreign trace data via the trace bus 220. The foreign trace data is then passed from the TPIU 240 to a trace port 250 where the trace data is output.

During this process, the SoC 180 may generate its own local trace data via its own Embedded Trace Macrocell (ETM) 260. This data is also passed via the trace bus 220 to the output circuitry 230. In this embodiment, both the local trace data and foreign trace data are output separately from the SoC 180. However, in other embodiments, amalgamation circuitry may be provided in order to amalgamate the local trace data and the foreign trace data.

It will be appreciated that in the embodiment shown in FIG. 1, it is possible for trace data from a first SoC 110 and a SoC 180 to be output using a single trace port. This is achieved by using an existing C2C interface 160, 170, 190, which allows the trace data generated at the first SoC 110 to be transferred to the second SoC 180, where it is output. As a consequence, not all of the trace ports of the multiple SoCs need be used. This therefore reduces the amount of circuitry required and in particular makes it possible for the overall circuit size and therefore power consumption to be reduced as compared to a system where each SoC requires a connection from its trace port. In particular, it will be appreciated that any device receiving communications from the trace port must sacrifice a number of I/O pins in order to enable such communication to take place. However, by making use of "existing" forms of communication that exist for chip-to-chip communication, the need for the trace port of each SoC to be connected can be reduced.

Figure 2:
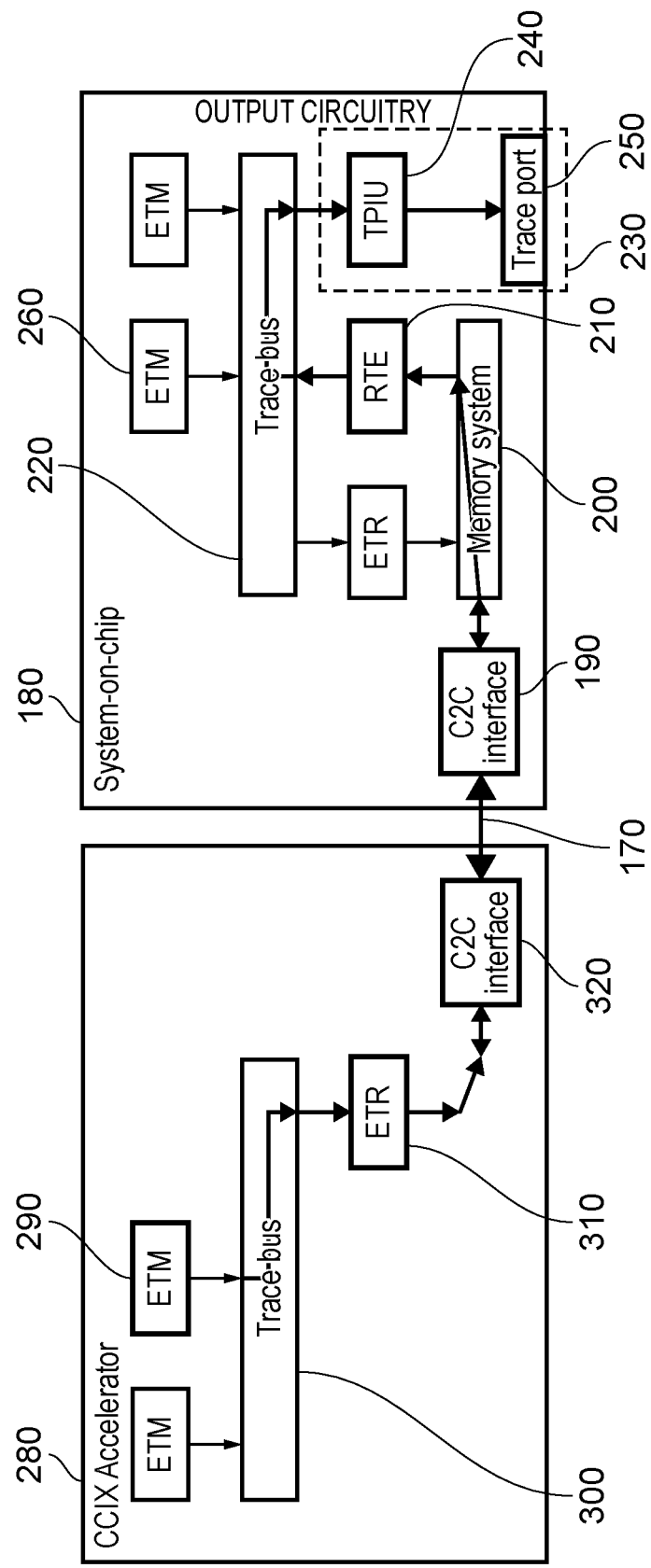
FIG. 2 illustrates an embodiment comprising an accelerator that provides trace data to a system-on-chip in accordance with some embodiments.

FIG. 2 illustrates an embodiment comprising a system 270 in which an accelerator 280 provides trace data to a SoC 180. In particular, an ETM 290, which is again an example of monitoring of the claimed monitoring circuitry, generates local trace data which is passed through a trace bus 300 to an ETM 310. Here, an encoded instruction is generated, which is passed to a C2C interface 320 through a channel 170 to a C2C interface 190 of a SoC 180. The process then continues as has been discussed with reference to FIG. 1. Accordingly, the present technique is also applicable to obtaining local trace data that is generated by monitoring circuitry of an accelerator such as a CCIX accelerator. This allows such trace data to be analysed.

Figure 3:
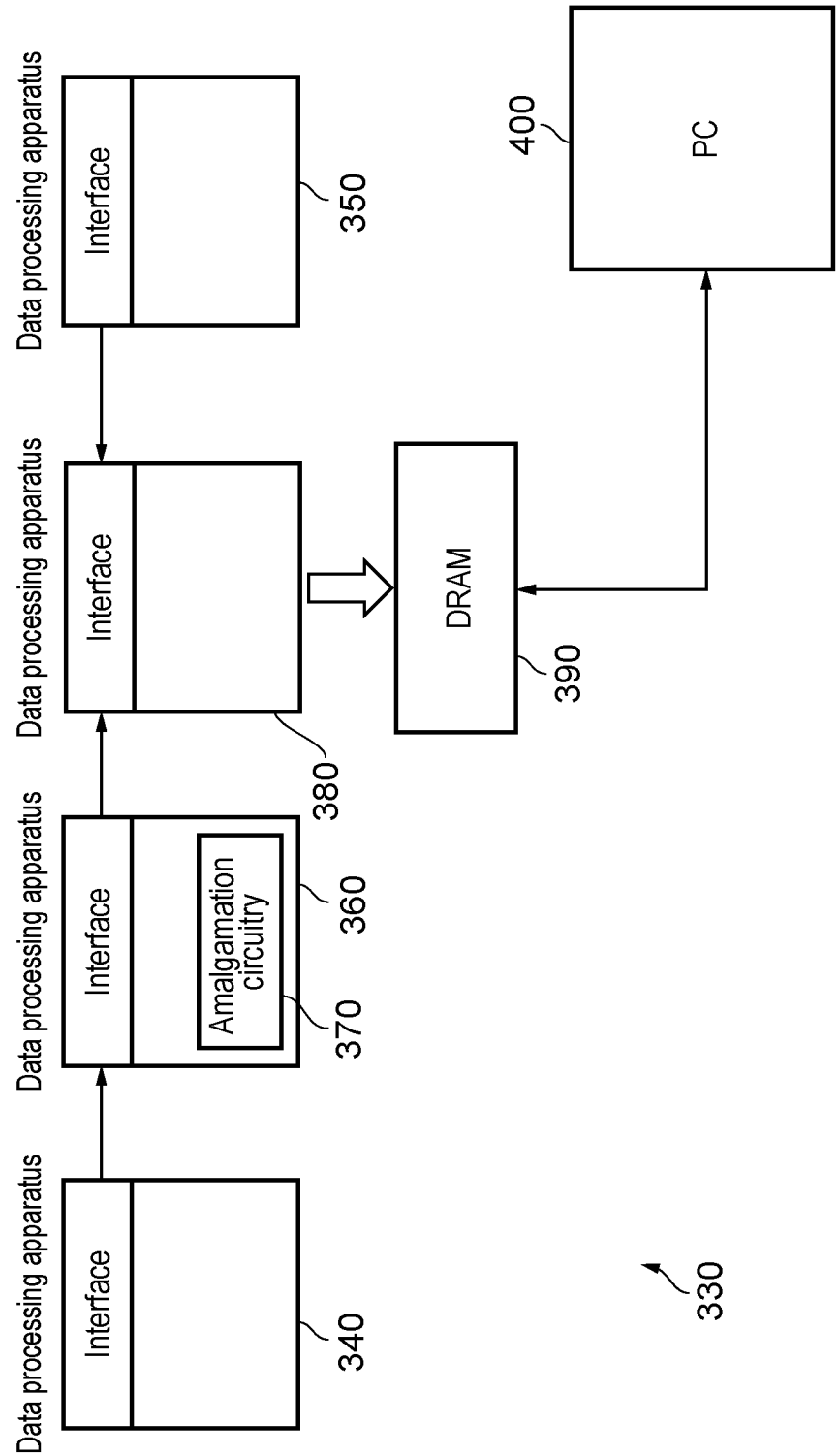
FIG. 3 relates to a system of data processing apparatuses in accordance with some embodiments.

FIG. 3 relates to an embodiment in which a system 330 of data processing apparatuses is provided. In particular, FIG. 3 demonstrates the different forms that a data processing apparatus may take. In the system 330, some of the data processing apparatuses 340, 350 generate local trace data and forward the trace data to another data processing apparatus 360, 380. One of those other data processing apparatuses 360, as well as generating its own local trace data, uses amalgamation circuitry 370 to amalgamate the local trace data with the foreign trace data which has been received via data processing apparatus 340. This amalgamated data is output to the data processing apparatus 380 that also receives the foreign trace data from the data processing apparatus 350. Similarly, the data processing apparatus that receives all of this trace data 380 also generates its own local trace data. All of this data is output to a DRAM 390. A conventional PC 400 can then be used to access the trace data via the DRAM 390. In this way, a user of the PC 400 can analyse the behaviour of each SoC/accelerator (data processing apparatus) 340, 350, 360, 380. Furthermore, since each of the data processing apparatuses 340, 350, 360, 380 communicates using existing C2C interface circuitry, all of the trace data can be accessed via the PC 400 by being output by trace output circuitry at one of the data processing apparatuses 380. This reduces a need for a large number of dedicated outputs to be provided by each individual data processing apparatus 340, 350, 360, 380. As a consequence, the overall circuitry size, and therefore power consumption requirements can be reduced as compared to a system that includes dedicated output circuitry for the trace data packets from each data processing apparatus 340, 350, 360, 380.

FIG. 4A illustrates a flow chart 410 that illustrates a method according to some embodiments. At a step 420 the behaviour of a data processing apparatus is monitored. At a step 430, on the basis of such monitoring, one or more local trace data packets are produced. At step 440, one of more encoded instructions are generated on the basis of the local trace data packets. At a step 450, the encoded instructions are transmitted to a second data processing apparatus. The encoded instruction is such that at the second data processing apparatus, the local trace data (now foreign trace data) will either be output at output circuitry of the second data processing apparatus or stored in storage circuitry of the second data processing apparatus.

FIG. 4B illustrates a flow chart 460 that describes a method according to some embodiments. At a step 470, foreign trace data is received from another data processing apparatus. The foreign trace data indicates the behaviour of the other data processing apparatus. This foreign trace data is received in the form of an encoded instruction, which is decoded in a step 480. Based on the decoded instruction, the data processing apparatus determines whether the foreign trace data is to be stored or output. This occurs at a step 490. This determination could be made based on a flag or a header in the encoded instruction itself indicating whether output or storage of the foreign trace data is desired. The determination could also or instead be made based on the availability of any trace outport port and knowledge as to whether local trace data is about to be output. For example, it may be desirable to output foreign trace data immediately if it is unlikely that local trace data is about to be output, since this could cause the foreign trace data to be held for an extended period of time. Otherwise, it might be desirable to delay outputting the foreign trace data so that it can, for instance, be amalgamated and compressed with the local trace data. If the data processing apparatus determines that the foreign trace data is to be stored, then at a step 500, the foreign trace data is stored in storage circuitry of the data processing apparatus. Otherwise, at a step 510, the foreign trace data is output at a trace port of the data processing apparatus.

In this way, it is demonstrated that trace data generated by one data processing apparatus can be provided for analysis without the need for dedicated trace output circuitry at that data processing apparatus. This can be achieved by using existing interface circuitry that enables one data processing apparatus to communication with another data processing apparatus, encoding the local trace data, forwarding the encoded trace data to the other data processing apparatus where it is decoded, and outputting the trace data from that other data processing apparatus. Since this can reduce the number of trace output circuitry that is required and can decrease the number of communication paths required, a number of I/O pins can be reduced. As a consequence of these reductions or removals, the circuitry size of the overall system and of some of the individual components can be reduced. Consequently, a power consumption of the overall system can therefore be reduced.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
    monitor circuitry to produce local trace data indicating a behaviour of said data processing apparatus;
    interface circuitry to communicate with a second data processing apparatus; and
    encoding circuitry to produce an encoded instruction that causes, when executed on said second data processing apparatus, said local trace data to be stored in storage circuitry of said second data processing apparatus or to be output at output circuitry of said second data processing apparatus,
    wherein said interface circuitry is configured to transmit said encoded instruction and said local trace data to said second data processing apparatus;
    the interface circuitry is further configured to communicate with a third data processing apparatus to receive foreign trace data indicating a behavior of said third data processing apparatus; and
    said encoding circuitry is adapted to produce a second encoded instruction that causes, when executed on said second data processing apparatus, said foreign trace data to be stored in said storage circuitry of said second data processing apparatus or to be output at the output circuitry of said second data processing apparatus; and
    wherein said interface circuitry is configured to transmit said foreign trace data to said second data processing apparatus.

2. A data processing apparatus according to claim 1, wherein
    said interface circuitry is an interface from the list comprising: CCIX, and Gen-Z.

3. A data processing apparatus according to claim 1, comprising:
    amalgamation circuitry to amalgamate said foreign trace data with said local trace data to produce amalgamated trace data, wherein
    said encoding circuitry has a separated mode of operation where said encoded instruction and said second encoded instruction are transmitted at said output circuitry separately; and
    said encoding circuitry has an amalgamated mode of operation where said encoded instruction is same as said second encoded instruction and said encoded instruction is adapted to cause said amalgamated trace data to be stored in said storage circuitry of said second data processing apparatus or to be output at the output circuitry of said second data processing apparatus.

4. A data processing apparatus according to claim 1, wherein
    said data processing apparatus is a System-on-Chip.

5. A method comprising:
    producing local trace data indicating a behaviour of a data processing apparatus;
    communicating with a second data processing apparatus using interface circuitry; and
    producing an encoded instruction that causes, when executed on said second data processing apparatus, to cause said local trace data to be stored in storage circuitry of said second data processing apparatus or to be output at output circuitry of said second data processing apparatus, wherein
    said encoded instruction and said local trace data are transmitted to said second data processing apparatus using said interface circuitry;
    the interface circuitry is further configured to communicate with a third data processing apparatus to receive foreign trace data indicating a behavior of said third data processing apparatus; and
    said encoding circuitry is adapted to produce a second encoded instruction that causes, when executed on said on said second data processing apparatus, said foreign trace data to be stored in said storage circuitry of said second data processing apparatus or to be output at the output circuitry of said second data processing apparatus; and
    wherein said interface circuitry is configured to transmit said foreign trace data to said second data processing apparatus.

* * * * *